Figures 1, 2:
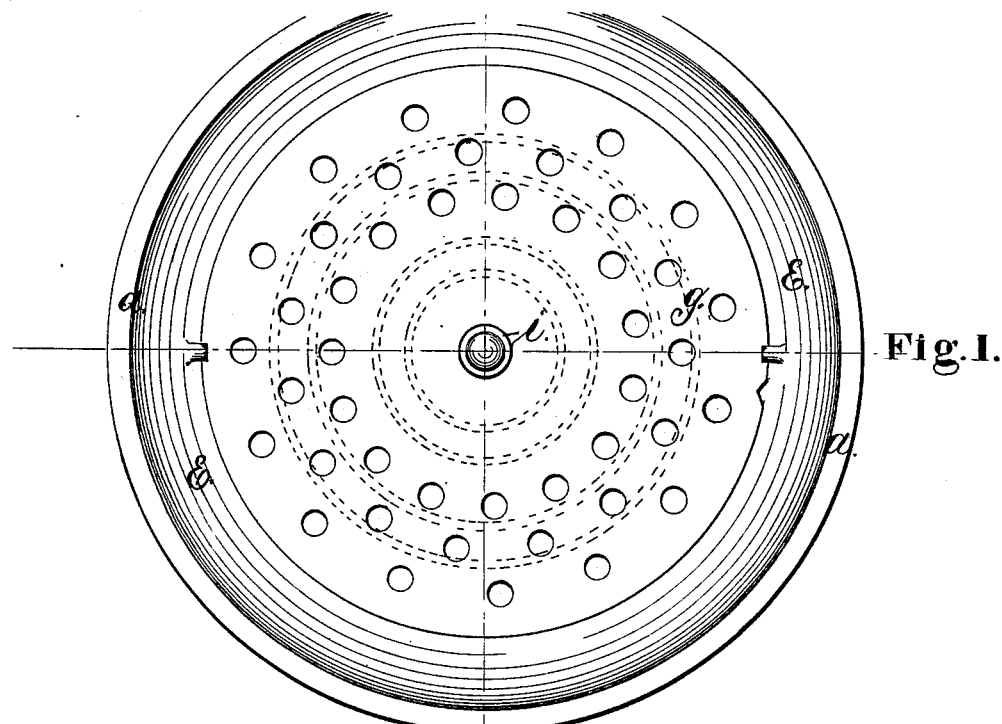

H. MILLER.
Sink-Traps.

No. 196,033. Patented Oct. 9, 1877.

WITNESSES.
L. P. Langworthy
Chas. Larkin

INVENTOR
Henry Miller
by Joseph A. Miller
Attorney

UNITED STATES PATENT OFFICE.

HENRY MILLER, OF PROVIDENCE, RHODE ISLAND.

IMPROVEMENT IN SINK-TRAPS.

Specification forming part of Letters Patent No. 196,033, dated October 9, 1877; application filed August 10, 1877.

*To all whom it may concern:*

Be it known that I, HENRY MILLER, of the city and county of Providence, State of Rhode Island, have invented certain new and useful Improvements in Sink-Traps; and I hereby declare that the following is a full, clear, and exact description of the same, reference being had to the accompanying drawings, forming part of this specification.

Figure 1 is a top view of my improved sink-trap, and Fig. 2 a vertical section through the center of the same.

The invention consists in the application of a loose but tightly-fitting stench-trap cup, with detachable stench-trap and strainer, to a sink provided with a strainer and arranged to receive a cup.

$a$ $a$ in the drawings represent either a depression formed in the sink and cast with the same, or a cup firmly secured to the sink. Its lower part is curved so as to produce the circular rim $b$, within which the strainer C is located, through which all water flows to the outlet $d$, from where it is conveyed to any point desirable. The upper edge of the rim $b$ forms the water-line, and the depression outside the rim the water-seal. E is a detachable cup or bowl, fitting into the depression $a$, and arranged to fit into a slight recess near its upper edge. At the lower part of the bowl $e$ the lip $f'$ forms with the rim $b$ a water-seal or trap, and near the center of the bottom the annular opening $f$, extending upward, forms with the annular rim $h$ of the strainer $g$ a stench-trap or water-seal. $i$ is a suitable handle for the strainer $g$.

This peculiar and novel arrangement of a sink-trap secures several important advantages: First, a strainer is permanently secured to prevent the admission of large matter to the pipe; second, the loose bowl E can be readily removed, washed, and replaced, as also the strainer $g$; third, the annular rims $b$ and $f'$ form a complete water-seal, and as soon as the bowl E is placed in the cup $a$ the annular rims $b$ and $f'$ form an air-tight joint; fourth, the strainer $g$ is loose, and can be easily removed or replaced.

By the facility of removing the whole, bad odors are avoided, as all parts can be kept clean and sweet, and when replaced all the joints will be water-sealed, and no sewer-gas can enter the house.

The construction is very simple, no drilling, tapping, or other mechanical labor being required to finish the same after a clean casting is secured.

The bowl E and strainer $g$ I prefer to tin, or otherwise cover with some kind of plating or enamel.

Having thus described my invention, I claim as new and desire to secure by Letters Patent—

The combination, with the sink-depression $a$, provided with the rim $b$, the strainer C, and outlet $d$, of the detachable bowl E, provided with the rim $f'$ and tube $f$, and the strainer $g$, provided with the rim $h$, arranged and operating substantially as and for the purpose described.

HENRY MILLER.

Witnesses:
  JOSEPH A. MILLER,
  OSCAR LAPHAM.